United States Patent

Patel et al.

[11] Patent Number: 6,152,482
[45] Date of Patent: Nov. 28, 2000

[54] VEHICLE INFLATABLE RESTRAINT SYSTEM TRIM WITH TRIM DEPLOYING MODULE

[75] Inventors: Rasik N. Patel, Canton; Glen Paul Ursaki, Fraser; Jeffrey Alan Chickola, Dearborn; Jay Blackson, Wyandotte, all of Mich.

[73] Assignee: Ford Global Technologies, Inc., Dearborn, Mich.

[21] Appl. No.: 09/318,948

[22] Filed: May 26, 1999

[51] Int. Cl.$^7$ ...................................................... B60R 21/22
[52] U.S. Cl. .............................................................. 280/730.2
[58] Field of Search ........................................... 280/730.2

[56] References Cited

U.S. PATENT DOCUMENTS

| | | |
|---|---|---|
| 5,265,903 | 11/1993 | Kuretake et al. . |
| 5,470,103 | 11/1995 | Vaillancourt et al. . |
| 5,490,691 | 2/1996 | Sinnhuber et al. . |
| 5,496,060 | 3/1996 | Whited et al. . |
| 5,540,459 | 7/1996 | Daniel . |
| 5,605,346 | 2/1997 | Cheung et al. . |
| 5,669,627 | 9/1997 | Marjanski et al. . |
| 5,788,270 | 8/1998 | Haland et al. . |
| 5,791,683 | 8/1998 | Shibata et al. . |
| 5,921,575 | 7/1999 | Kretschmer et al. ................ 280/728.2 |
| 5,924,723 | 7/1999 | Brantman et al. ................... 280/730.2 |
| 5,938,233 | 8/1999 | Specht ................................. 280/730.2 |
| 5,957,487 | 9/1999 | Stutz ................................... 280/730.2 |
| 6,010,149 | 1/2000 | Riedel et al. ....................... 280/730.2 |
| 6,082,761 | 7/2000 | Kato et al. .......................... 280/730.2 |

*Primary Examiner*—Brian L. Johnson
*Assistant Examiner*—Tony Winner

[57] ABSTRACT

An inflatable restraint module for an automotive vehicle has a module housing longitudinally mounted adjacent a roof rail with an inflatable restraint mounted therein for movement from a stowed position to an inflated position along an interior of the vehicle body side. The module housing has a flap member, deployable by inflation of the inflatable restraint, to operatively force a headliner assembly over a pillar trim piece and to route the inflatable restraint past the pillar trim.

7 Claims, 2 Drawing Sheets

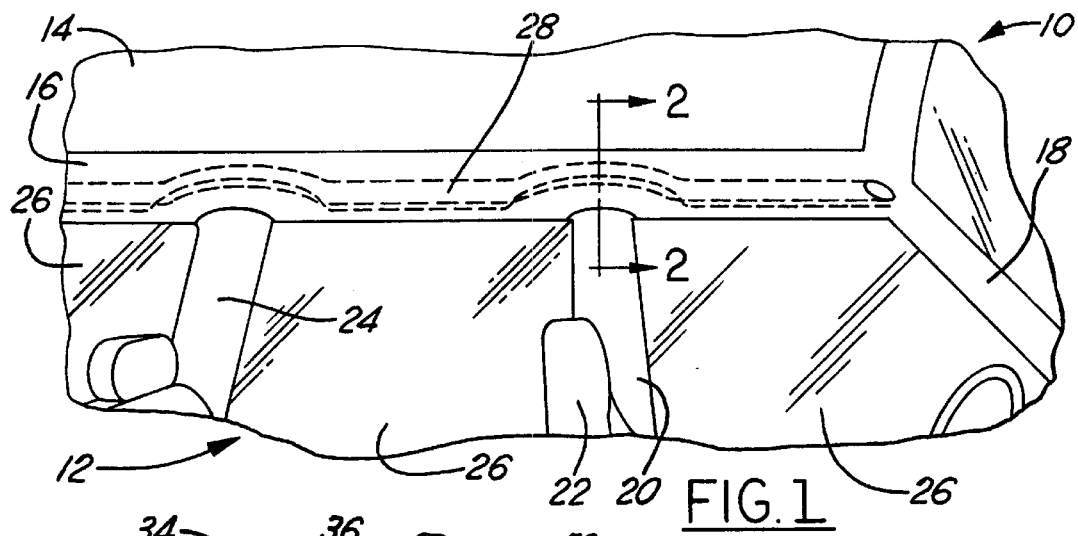
FIG. 1
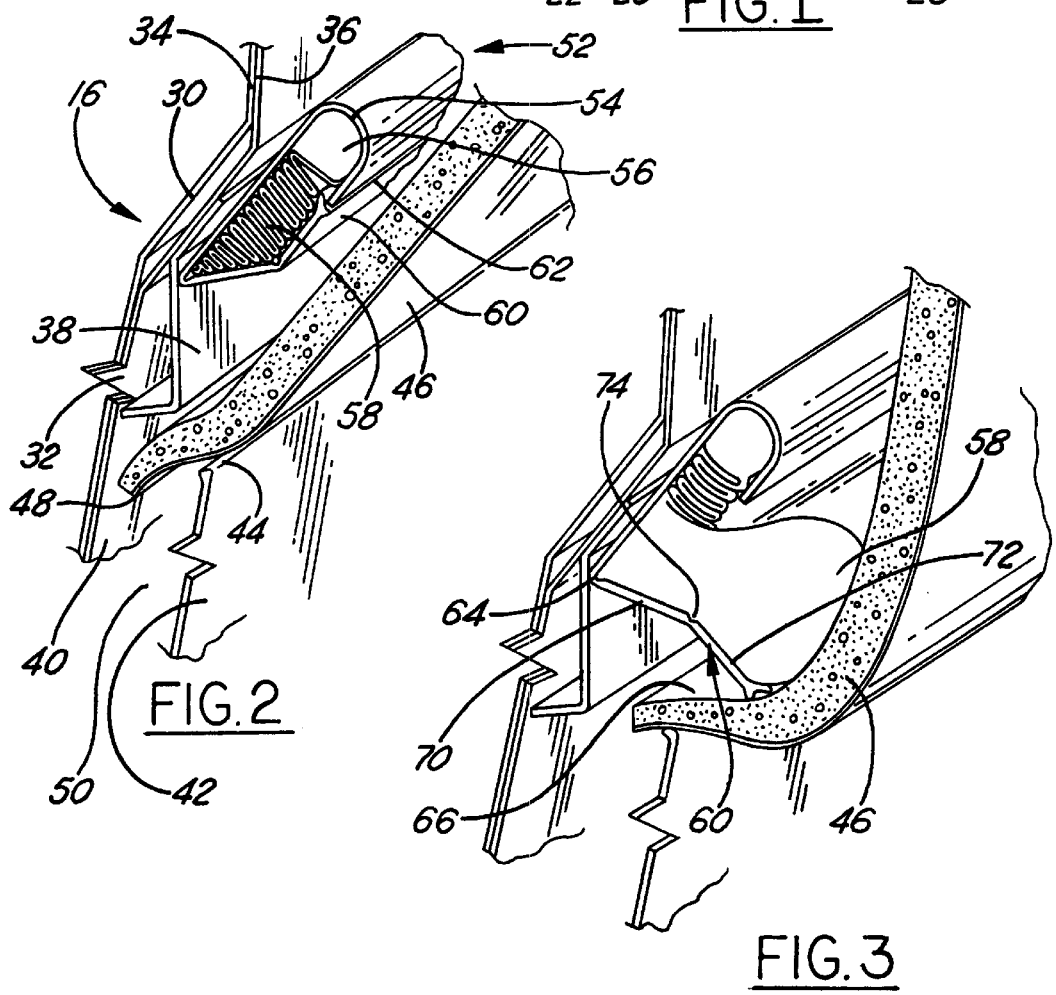
FIG. 2
FIG. 3

VEHICLE INFLATABLE RESTRAINT SYSTEM TRIM WITH TRIM DEPLOYING MODULE

FIELD OF THE INVENTION

The present invention relates generally to inflatable occupant restraints for automotive vehicles and more particularly to such restraints deployed on the sides of the vehicles.

BACKGROUND OF THE INVENTION

The use of inflatable occupant restraints, or airbags, in automotive vehicles has become common in the automotive industry. Most new vehicles are configured with inflatable occupant restraint systems which respond to frontal impacts. In order to enhance the energy absorbing capability of their products, the automotive industry has turned its attention to developing energy absorbing restraints responsive to excessive loading laterally of a vehicle.

One of the areas of the vehicle under consideration for use of inflatable occupant restraints to decrease lateral loading is the interior side of the vehicle, for example, the area between the upper portion of an occupant and the vehicle side glass. Japanese Patent Application 3-276844 to Mazda Motor Corporation is exemplary of one approach to providing airbags in the space adjacent the upper portion of a vehicle occupant in the front seat of a vehicle. Another approach for a roof side rail mounted side inflatable restraint system is shown in U.S. Pat. No. 5,540,459 (Daniel), assigned to the assignee of the present invention, which is adequate for that portion of the interior vehicle side between the A and B pillars. It has become desirable, however, to extend the side air bag system across pillars to form a curtain along a substantial portion of the vehicle side interior to provide a restraint for most, or all, occupants in the vehicle seats adjacent a side. A system is thus needed which can deploy from a roof longitudinally along a side of the vehicle to cover pillar sections, windows and other side interior sections of a vehicle. One design attempting to provide such a system, U.S. Pat. No. 5,788,270 (Haland), employs an airbag mounted in a recess in the door frame, but does not address packaging of such a system with respect to a roof headliner or pillar trim.

SUMMARY OF THE INVENTION

Responsive to the deficiencies of the prior art, an inflatable restraint system is provided for an automotive vehicle having a body, including a passenger compartment, extending longitudinally of the vehicle with an upper end mounted by a roof and a side bounded by a body side panel and having a longitudinally extending roof side rail. The roof has a headliner attached thereto and cooperates with trim pieces covering the pillars supporting the roof to provide a visually esthetic passenger compartment interior appearance. The inflatable restraint system comprises a module housing longitudinally mounted on a laterally inner surface of the roof rail, an inflator for discharging inflator gas, and an inflatable restraint mounted within the housing adjacent the opening when in a stowed position and operatively connected with the inflator to receive inflator gas therefrom for movement to a deployed position along an interior surface of the vehicle side. A flap member in a module housing is movable to a chute position operatively engaging an inner surface of the headliner to force a lower edge thereof past an upper edge of the trim panel and to route the inflatable restraint thereover.

BRIEF DESCRIPTION OF THE DRAWINGS

These and other objects, advantages, and features of the present invention will be apparent to those skilled in the art upon reading the following description with reference to the accompanying drawings, in which:

FIG. 1 is an interior review of an automotive vehicle in which the inflatable restraint of the present invention is installed;

FIG. 2 is a cross-sectional perspective view taken along line 2—2 of FIG. 1 showing the inflatable restraint in a stowed position within the module housing;

FIG. 3 is a cross-sectional view similar to FIG. 2 but showing the inflatable restraint in an initially deployed position showing the module housing flat member engaging the headliner;

DETAILED DESCRIPTION OF THE PREFERRED EMBODIMENTS

Figure 4:
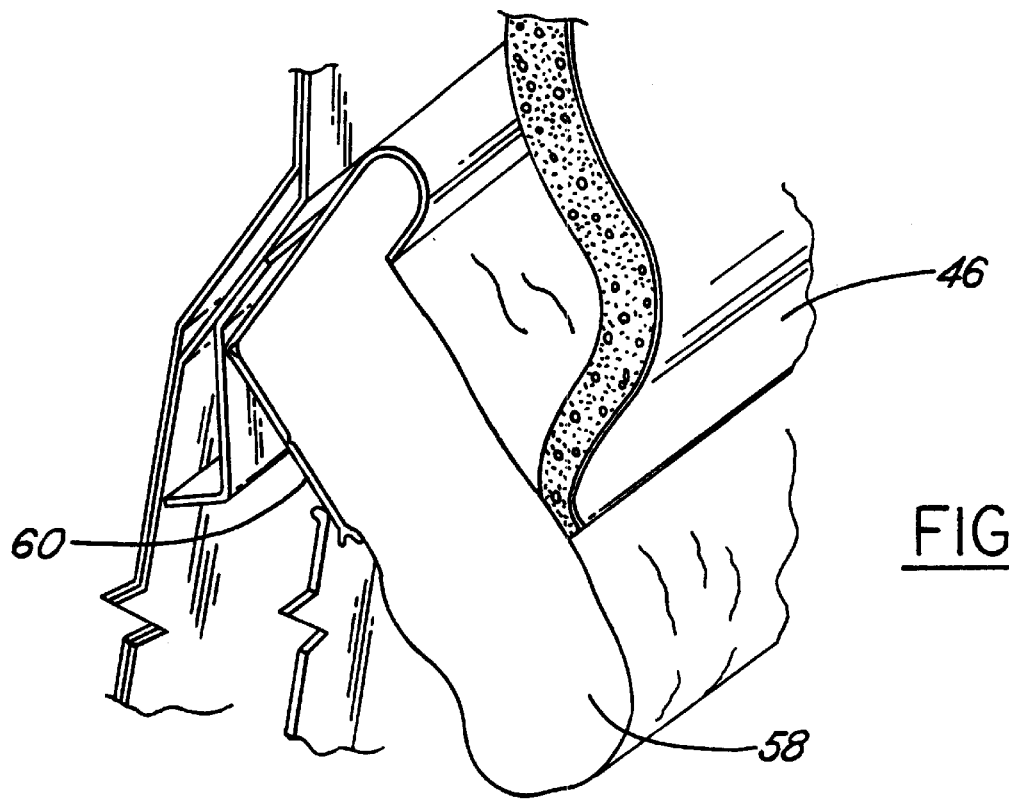
FIG. 4 is a cross-sectional perspective view similar to FIG. 3 but showing the flat member forming a shoot to direct the inflatable restraint exteriorly of the pillar trim piece.

Turning now to the drawings, and in particular to FIG. 1 thereof, an automotive vehicle 10 is illustrated as having a passenger compartment, generally indicated at 12, partially bounded on the top by a roof 14, as is conventional in vehicle body construction. A roof rail 16 is fixedly secured to the roof 14 and to vertically extending pillars, including a forwardmost A-pillar 18, a B-pillar 20 generally adjacent the front seats (shown at 22), and a C-pillar 24 rearward of the B-pillar 20. In vehicles having a compartment rearward of the second row seating in spatial communication with the passenger compartment 12, a D-pillar (not shown) also serves to support the roof 14, as construction is common in sport utility vehicles. Windows 26, either movable or fixed, are positioned between the pillars in a known manner. The pillars 18, 20, 24, the windows 26, and other body panels, including the vehicle doors (not shown) collectively comprise the vehicle body side. To provide an energy absorbing cushion between the passenger compartment 12 and the body side and roof 14, an inflatable restraint device 28 is carried with the roof rail 16.

Referring next to FIG. 2, the roof rail 16 is illustrated as comprising an outer panel 30 and an inner panel 32 which are preferably conventionally secured together, as by welding, at flanges 34, 36. Attached to the inner panel 32 is a mounting plate 38 which is substantially longitudinally coextensive with the roof rail 16. The pillar structure, shown at 40, is covered by a trim piece 42 in conventional fashion. The trim piece 42 has an upper edge 44 over which is tucked a roof headliner 46 so that a free edge 48 thereof rests in a space 50 between the pillar structure 40 and the trim piece 42 out of sight of the passenger compartment 12.

Mounted on an inner surface of the panel 38 coextensively with the roof rail 16 is an inflatable restraints module 52 (FIG. 2). The module 52 includes a housing 54 carrying an inflator 56 for discharging inflator gas to an inflatable restraint 58, often referred to as an airbag. The inflatable restraint 58, which is typically folded, or flaked, in a stowed position, as seen in FIG. 2, is in fluid communication with the inflator for receiving the inflator gas therefrom which can be conventionally generated through use of known propellants, or other gas generating means.

The housing 54 has a flap member 60 on a lower, laterally inward portion thereof, partially defined by a tear seam 62. The tear seam 62 is preferably located in a middle, or top, portion of the housing 54, as opposed to a conventional bottom located tear seam. With such a construction, the flap 60 may pivot about a bottom edge 64 during airbag deployment (FIG. 3) to operatively interact with an outer surface 66 of the headliner 46 pushing it inwardly toward the passenger compartment. As the airbag 58 continues to expand, the free edge 48 of the headliner 46 is forced from the space 50 over the upper edge 44 of the trim piece 42. Expansion of the airbag 58 further forces the flap member 60 into a chute position (FIG. 4) resting on the upper edge 44 of the trim piece 42, thus routing the airbag 58 over the trim piece 42 and into the passenger compartment along the vehicle side interior (FIG. 5). In the deployed position of FIG. 5, the airbag 58 provides enhanced energy absorption substantially along the longitudinal extent of the passenger compartment, for example, for passengers 68.

Figure 5:
FIG. 5 is a perspective interior view of the passenger compartment showing deployment of the side curtain airbag according to the present invention.

During an event in which operation of the inflatable restraint system of the present invention is effected, gases are generated, or stored gases released, from the inflator 56 to expand the airbag 58 from the stowed condition (FIG. 2) to its inflated position (FIGS. 4 and 5). During this inflation, the headliner 46 flexes laterally inwardly away from the roof rail 16, and the flap member 60 breaks along the tear seam 62 and rotates to cover the space 50, thus routing the airbag 58 into the passenger compartment 12 substantially vertically spanning the vehicle body side interior.

As seen in FIGS. 2–4, the flap member 60 may have multiple sections 70, 72 (FIG. 3) defined by a crease 74 to facilitate airbag 58 deployment.

While the housing 54 is shown having a single deployable flap member 60, it should be understood that other variations of the flap member 60 are possible, including, but not limited to, a flap arrangement having upper and lower deployable flaps with a tear seam therebetween.

It should be understood that the present invention may be used with multiple vehicle interior configurations and is not limited to the vehicle shown in the drawings, which are meant to be illustrative and not limiting.

Although the preferred embodiment of the present invention has been disclosed, various changes and modifications may be made without departing from the scope of the invention as set forth in the appended claims.

What is claimed is:

1. In an automotive vehicle having a body including a passenger compartment extending longitudinally of the vehicle with an upper end bounded by a roof supported by a plurality of pillars extending from a body side defining window openings therebetween and having a longitudinally extending roof side rail, each of the plurality of pillars covered by a trim piece inwardly covered with a headliner assembly, an inflatable restraint system comprising:

a module housing longitudinally mounted on a laterally inner surface roof rail;

an inflator for discharging inflator gas;

an inflatable restraint mounted within the housing within a stowed position and operatively connected with the inflator to receive inflator gas therefrom for movement to an inflated position along an interior surface of the vehicle side; and a flap member integral with the module housing when the inflatable restraint is in the stowed position and movable to a chute position, the flap member operative to engage an inner surface of the headliner to force a lower edge thereof past an upper edge of the trim panel when moving to the chute position, the flap member resting upon the upper edge of the panel when in the chute position to route the inflatable restraint thereover.

2. The system of claim 1, wherein the module housing has a tear seam on a laterally inward side thereof.

3. The system of claim 1, wherein the inflatable restraint deploys sideways through the module housing.

4. The system of claim 1, wherein the flap member has at least two bendable sections.

5. The system of claim 1, wherein the inflatable restraint is an airbag folded within the module housing in fluid communication with the inflator.

6. The system of claim 1, wherein the inflatable restraint substantially covers the longitudinal extent of the passenger compartment when the inflatable restraint is in the inflated position.

7. The system of claim 1, wherein the headliner assembly is formed of a resilient material operative to deflect away at its lower edge from the roof side rail as the inflatable restraint expands to the inflated position.

* * * * *